(12) United States Patent
Raper et al.

(10) Patent No.: US 7,784,559 B1
(45) Date of Patent: Aug. 31, 2010

(54) SUBSOIL RIPPER WITH ATTACHMENT

(75) Inventors: Randy L. Raper, Auburn, AL (US);
Eric B. Schwab, Opelika, AL (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 655 days.

(21) Appl. No.: 11/523,393

(22) Filed: Sep. 19, 2006

(51) Int. Cl.
*A01B 13/08* (2006.01)
(52) U.S. Cl. .................... 172/700; 172/196
(58) Field of Classification Search ............. 172/699, 172/700, 195, 196; D15/11
See application file for complete search history.

(56) References Cited

U.S. PATENT DOCUMENTS

| | | | | |
|---|---|---|---|---|
| 122,261 | A * | 12/1871 | Lamb | 172/671 |
| 139,617 | A * | 6/1873 | Rohmer | 111/194 |
| 250,151 | A * | 11/1881 | Lane | 172/196 |
| 459,667 | A * | 9/1891 | Wilson | 172/166 |
| 1,074,176 | A * | 9/1913 | Huggins | 172/196 |
| 1,162,842 | A * | 12/1915 | Yost | 172/166 |
| 1,313,611 | A * | 8/1919 | Stirling | 172/604 |
| 1,523,797 | A * | 1/1925 | Bauer | 172/16 |
| 2,785,613 | A * | 3/1957 | Staats, Sr. | 172/68 |
| 3,170,421 | A * | 2/1965 | Norris et al. | 111/148 |
| 3,202,222 | A * | 8/1965 | Norris | 172/177 |
| 3,621,800 | A * | 11/1971 | Rellinger | 111/123 |
| 3,692,120 | A * | 9/1972 | Cline | 172/151 |
| 3,745,944 | A * | 7/1973 | Yetter et al. | 111/123 |
| 3,747,688 | A * | 7/1973 | Woerman et al. | 172/149 |
| 3,935,906 | A * | 2/1976 | Neal et al. | 172/177 |
| 4,024,921 | A | 5/1977 | Tibbs, II | |
| 4,050,521 | A | 9/1977 | Rowan | |
| 4,051,904 | A * | 10/1977 | van der Lely et al. | 172/49.5 |
| 4,055,126 | A * | 10/1977 | Brown et al. | 111/148 |
| 4,069,875 | A | 1/1978 | Mills | |
| 4,142,588 | A * | 3/1979 | Doss | 172/190 |
| 4,187,916 | A * | 2/1980 | Harden et al. | 172/146 |
| 4,244,306 | A * | 1/1981 | Peterson et al. | 111/187 |
| 4,461,355 | A * | 7/1984 | Peterson et al. | 172/156 |
| 4,478,289 | A * | 10/1984 | Enix | 172/136 |
| 4,524,837 | A | 6/1985 | Harden | |
| 4,628,839 | A * | 12/1986 | Edmisson | 111/123 |
| 4,699,220 | A * | 10/1987 | Strohm | 172/160 |
| 5,046,346 | A * | 9/1991 | Pegoraro | 172/71 |

(Continued)

OTHER PUBLICATIONS http://www.britannica.com/EBchecked/topic/9620/agricultural-technology/67767/Primary-tillage-equipment#ref558246.*
http://www.britannica.com/EBchecked/topic/9620/agricultural-technology/67767/Primary-tillage-equipment#ref558246 Jan. 19, 2005.*
ASAE,"Terminology for Soil-Engaging Components for Conservation-Tillage Planters, Drills, and Seeders," *ASAE Standards 2002*, Dec. 2001, S477, pp. 345-350.

*Primary Examiner*—Thomas B Will
*Assistant Examiner*—Jamie L McGowan
(74) *Attorney, Agent, or Firm*—John D. Fado; Robert D. Jones

(57) ABSTRACT

A subsoil ripper for subsoil tillage, where a spur is operatively connected to the shank of the subsoil ripper; for example, operatively connected to the posterior of the shank of the subsoil ripper.

20 Claims, 12 Drawing Sheets

U.S. PATENT DOCUMENTS

| | | | |
|---|---|---|---|
| 5,309,852 A * | 5/1994 | Zimmerman | 111/121 |
| 5,390,745 A * | 2/1995 | Harden | 172/175 |
| 5,415,236 A | 5/1995 | Williams | |
| 5,605,196 A | 2/1997 | Grimm et al. | |
| 5,695,012 A | 12/1997 | Kesting | |
| 5,782,307 A * | 7/1998 | Forsyth | 172/156 |
| 5,819,855 A * | 10/1998 | Tarver, III | 172/166 |
| 5,913,368 A * | 6/1999 | Horton et al. | 172/133 |
| 6,009,955 A * | 1/2000 | Tarver, III | 172/166 |
| 6,761,120 B2 * | 7/2004 | Kovach et al. | 111/140 |
| 7,024,846 B2 | 4/2006 | Bruening | |

* cited by examiner

SUBSOIL RIPPER WITH ATTACHMENT

BACKGROUND OF THE INVENTION

This invention relates to subsoil tillage and, more particularly, to an attachment to a subsoil ripper to improve crop growth in areas where deep tillage is needed.

Long-term continuous cotton production in the soil of the Tennessee Valley region of northern Alabama has resulted in soil degradation due to soil erosion, loss of organic matter, and soil compaction. This degradation has slowly reduced the cotton yield potential in the region and has caused farmers to look for alterative cropping systems to improve soil quality. As a result some farmers turned to a no-tillage system in the early 1990s. However, the no-tillage system increased soil surface compaction, restricted root growth, and reduced yield compared to conventional tillage. These complications have been key in preventing the widespread adoption of this system (Burmester, C. H., et al., 1993, No-till cotton growth characteristics and yield in Alabama. p. 30-36, in P. K. Bollich (ed.) Proc. Southern Conservation Tillage Conference for Sustainable Agriculture, Monroe, La., 15-17 Jun. 1993, Manuscript no. 93-86-7122, Louisiana State Agric. Exp. Stn., Baton Rouge, La.). It was thought that one no-tillage system utilizing deep tillage could reduce soil compaction and still improve soil quality (Raper, R. L., et al., Appl. Eng. Agric., 16(4):379-385 (2000); Schwab, E. B., et al., Soil Sci. Soc. Am. J., 66:569-577 (2002)); this modified no-tillage system was expected to produce yields similar to conventional tillage, reduce soil compaction, and increase soil organic matter. However, the soil conditions below the deep tillage depth were degraded as a result of the deep tillage. The higher clay content commonly seen below the tillage depth resulted in an increase in soil compaction and soil smearing. This compaction and smearing are believed to restrict root growth and water movement below the tillage depth.

We have developed an attachment for deep tillage shanks to reduce or eliminate these problems in soils and regions similar to those found in the Tennessee Valley region of north Alabama.

SUMMARY OF THE INVENTION

A subsoil ripper for subsoil tillage, where a spur is operatively connected to the shank of the subsoil ripper; for example, operatively connected to the posterior bottom end of the shank of the subsoil ripper

DETAILED DESCRIPTION OF THE INVENTION

When a subsoiler shank is pulled through the soil, the soil tends to smear towards the bottom of the area where the subsoiler is pulled. This soil smearing is also found about halfway up the sides of the channel created by the subsoil ripper as it passes through the soil. In contrast, the soil is usually completely disrupted from about halfway up the shank on towards the surface. The present invention solves the problem of this soil smearing.

Figure 1:
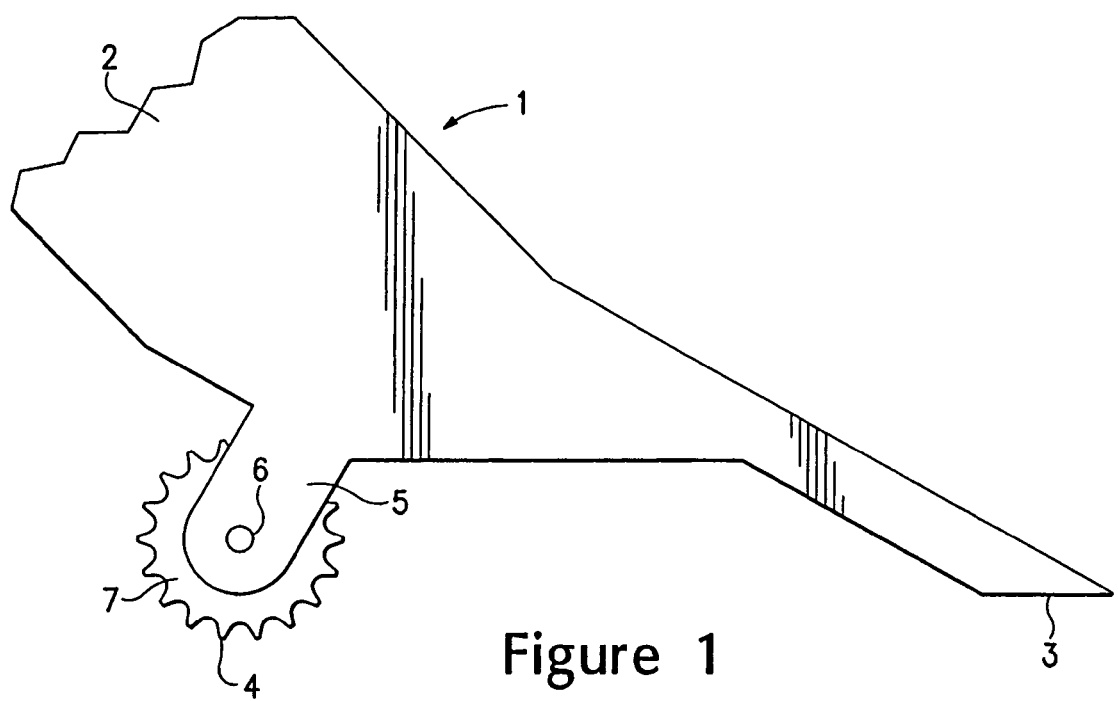
FIG. 1 is a side perspective view of one embodiment of the invention.
Figure 2:
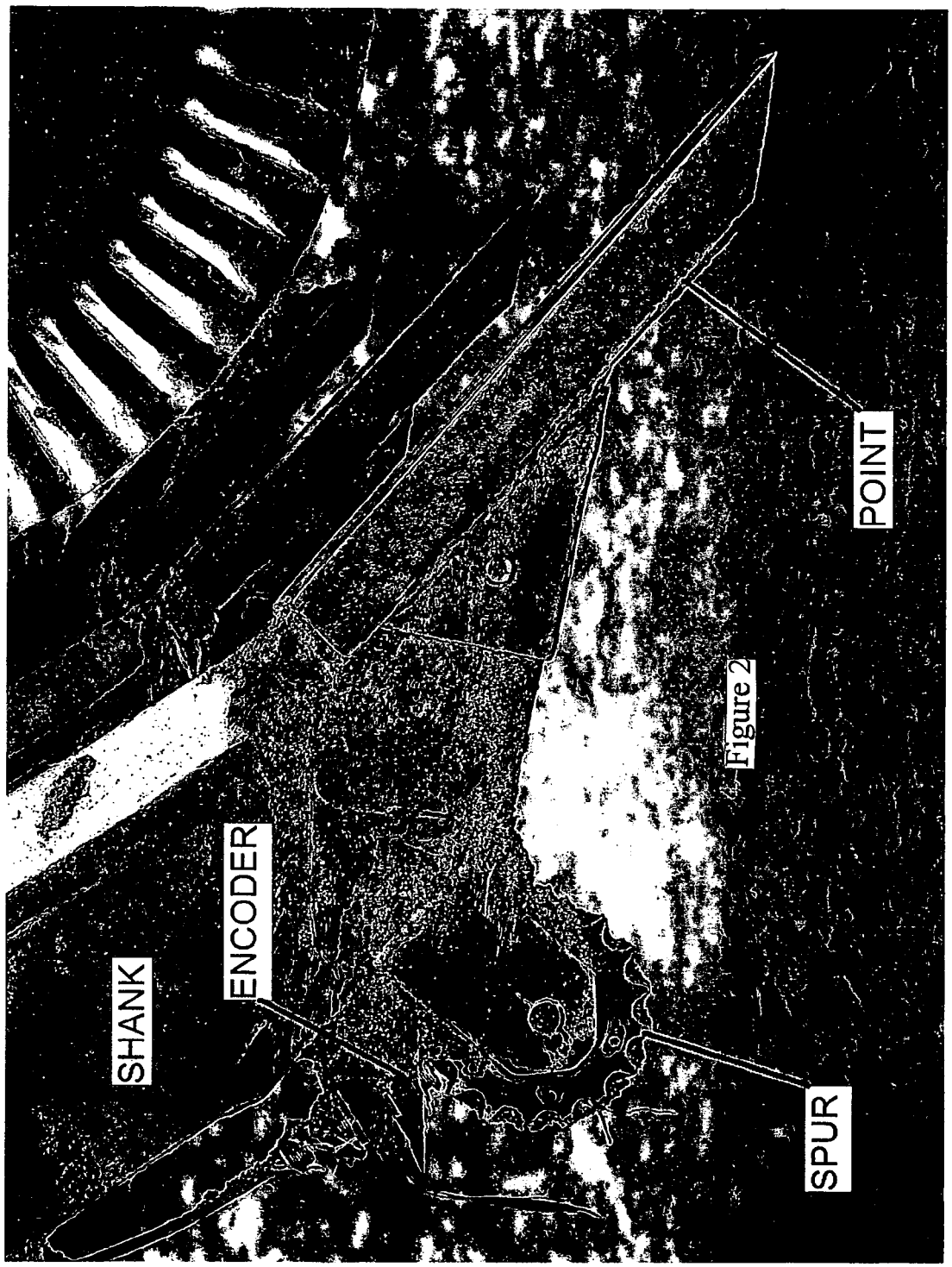
FIG. 2 is a photograph of one embodiment of the invention (encoder determined if the spur was turning).
Figure 3:
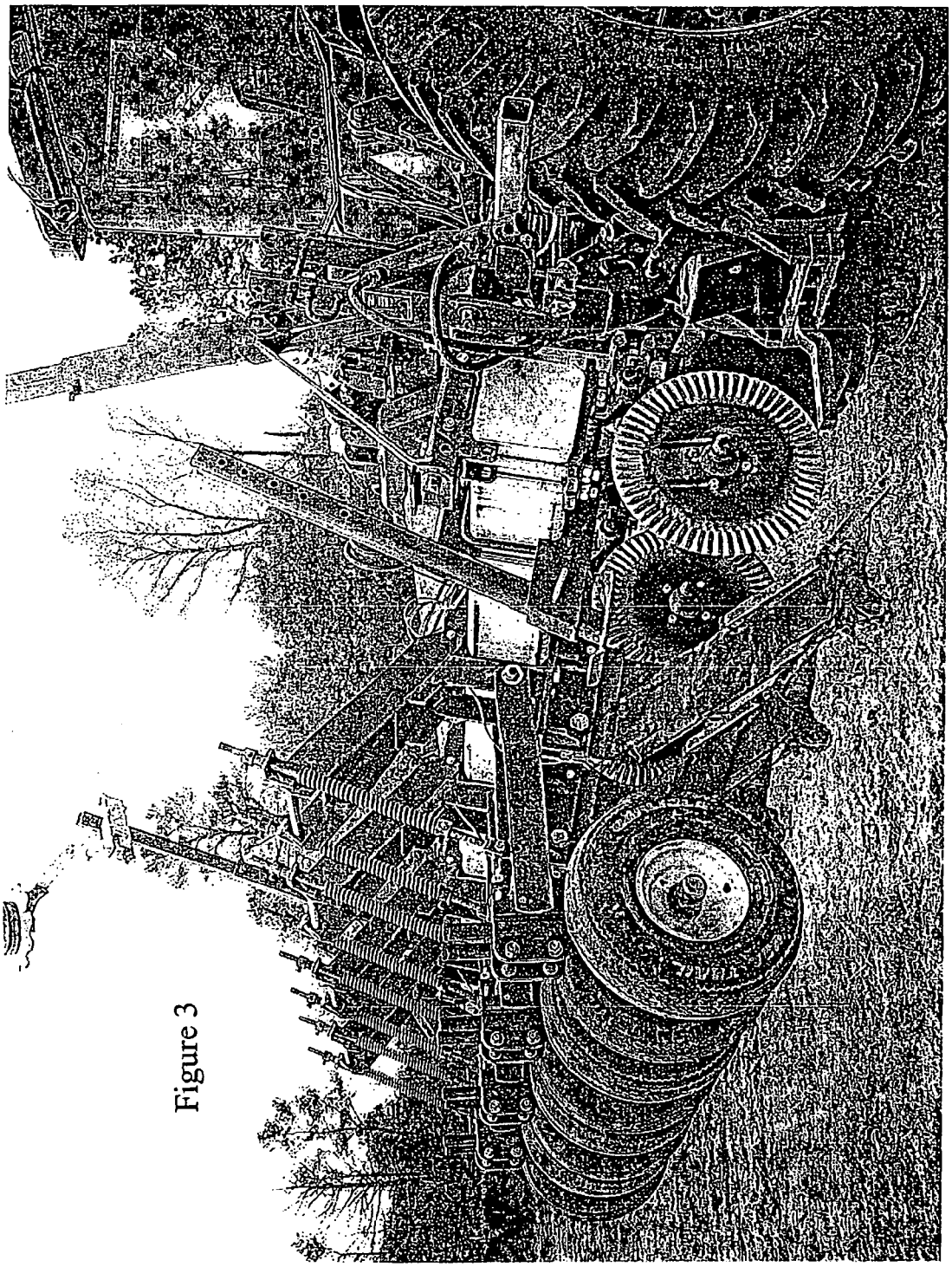
FIG. 3 is a photograph of one embodiment of the invention.

FIG. 1 is a side perspective view of a subsoil ripper 1 for subsoil tillage showing shank 2 and point or deep cutting subsoiler tool 3. In one embodiment spur 7 is attached on the rear of the shank 2 near the lower end of the shank. The bottom of spur 7 projects slightly (e.g., about 0.25-about 0.5 inches) below the deep cutting subsoiler tool 3 so that the spur, as it rotates, slightly tills up the soil that is smeared by a conventional subsoil ripper that lacks a spur. The spur 7 is operatively connected to the shank 2, for example by welding a bracket 5 to the shank 2, and the spur 7 is operatively connected to the bracket 5 for example by a bolt 6 through a hole at the center of the spur 7; the spur 7 is thus free to rotate, and there may be more than one spur side by side attached together to the bracket by the bolt. FIGS. 2 and 3 are photographs of one embodiment of the invention.

Figure 4:
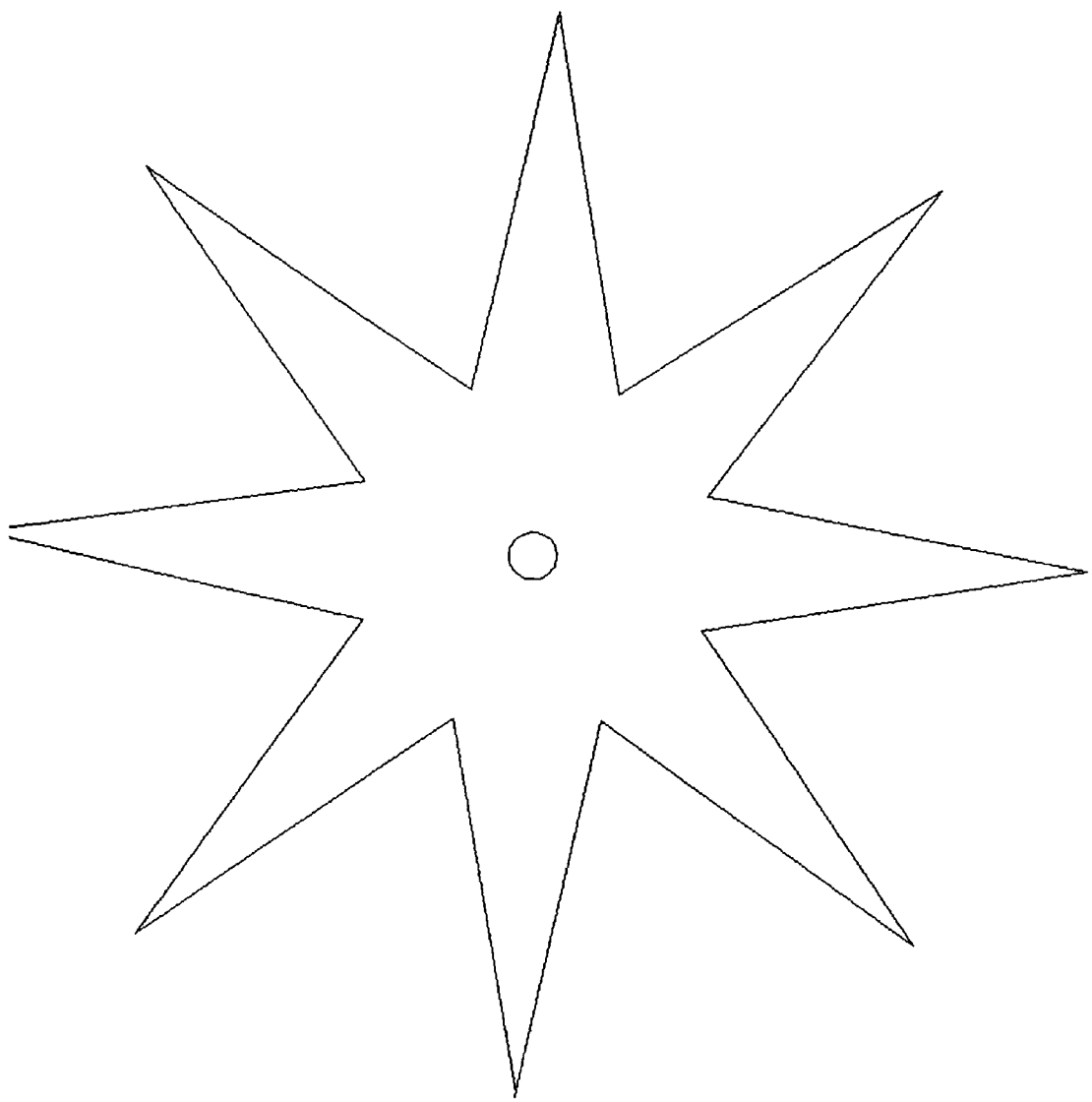
FIG. 4 is a side perspective view of one embodiment of the invention.
Figure 5:
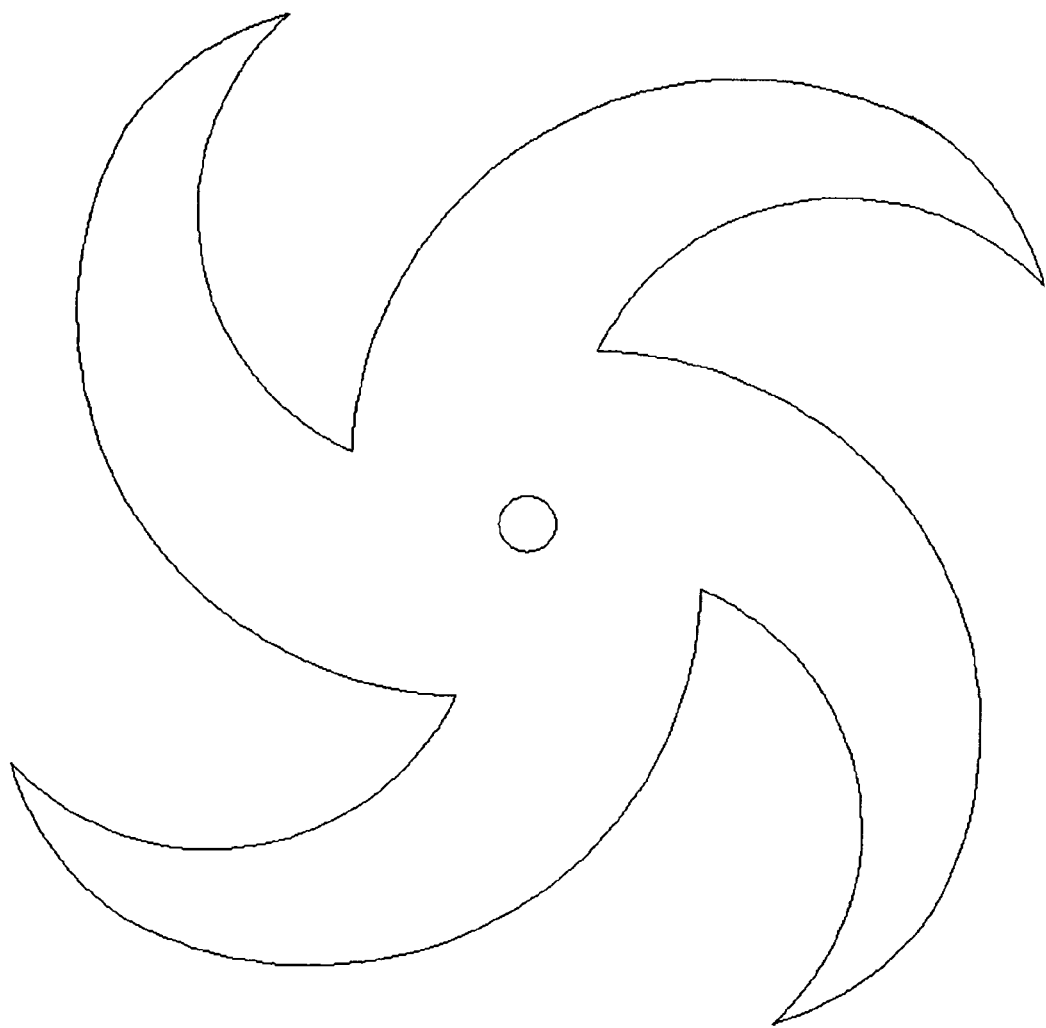
FIG. 5 is a side perspective view of one embodiment of the invention.
Figure 6:
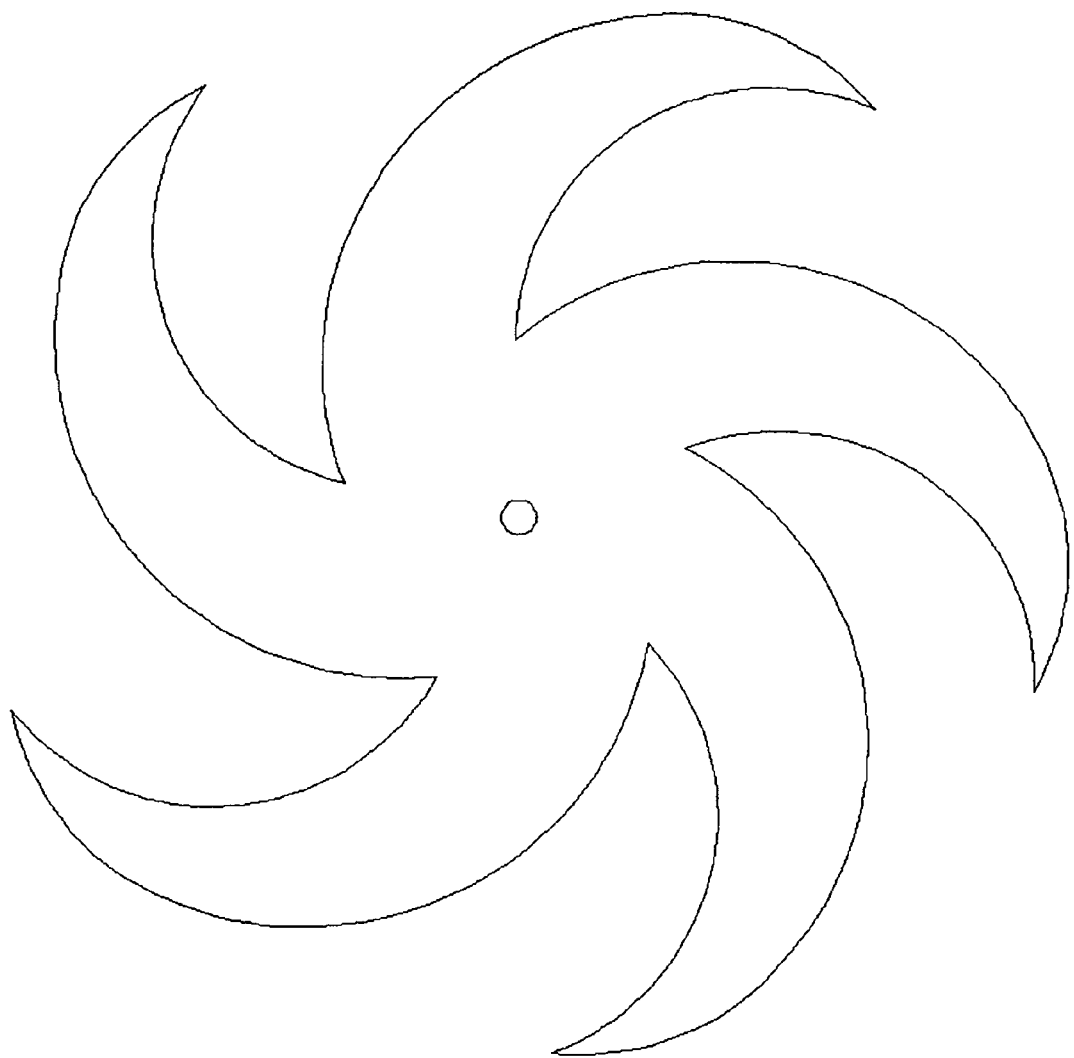
FIG. 6 is a side perspective view of one embodiment of the invention.

The spurs may be cut from metal plate and may have varied designs and shapes, for example a plurality of straight or curved arms or spikes 4 (FIGS. 4-6). The spur may even be a commercially available sprocket used for other purposes in agricultural machines. The number of arms can vary, generally from about 3 to about 30 (e.g., 3-30), preferably about 4 to about 20 (e.g., 4-20). The spur is generally about 3 to about 6 inches (e.g., 3-6 inches) in diameter and about 0.25 to about 1.5 inches (e.g., 0.25-1.5 inches) thick.

Figure 7:
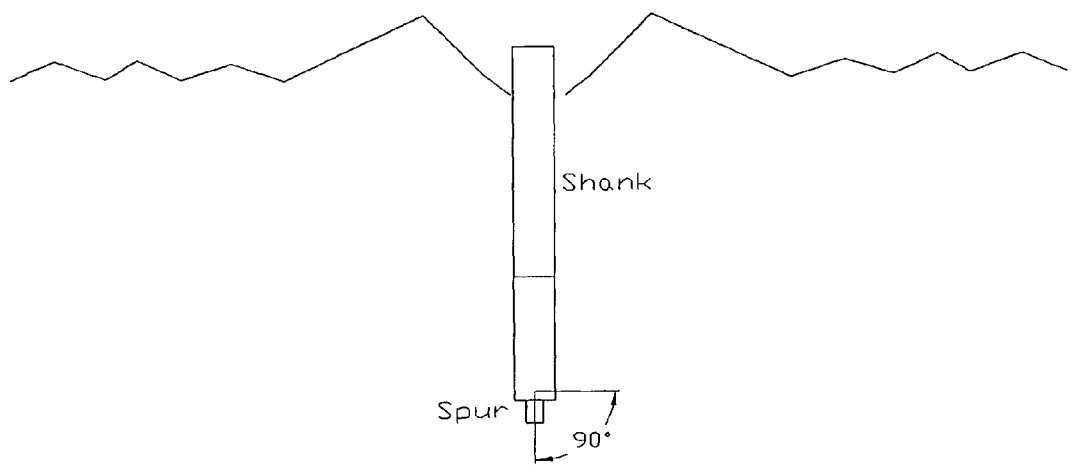
FIG. 7 is a front view of one embodiment of the invention.
Figure 8:
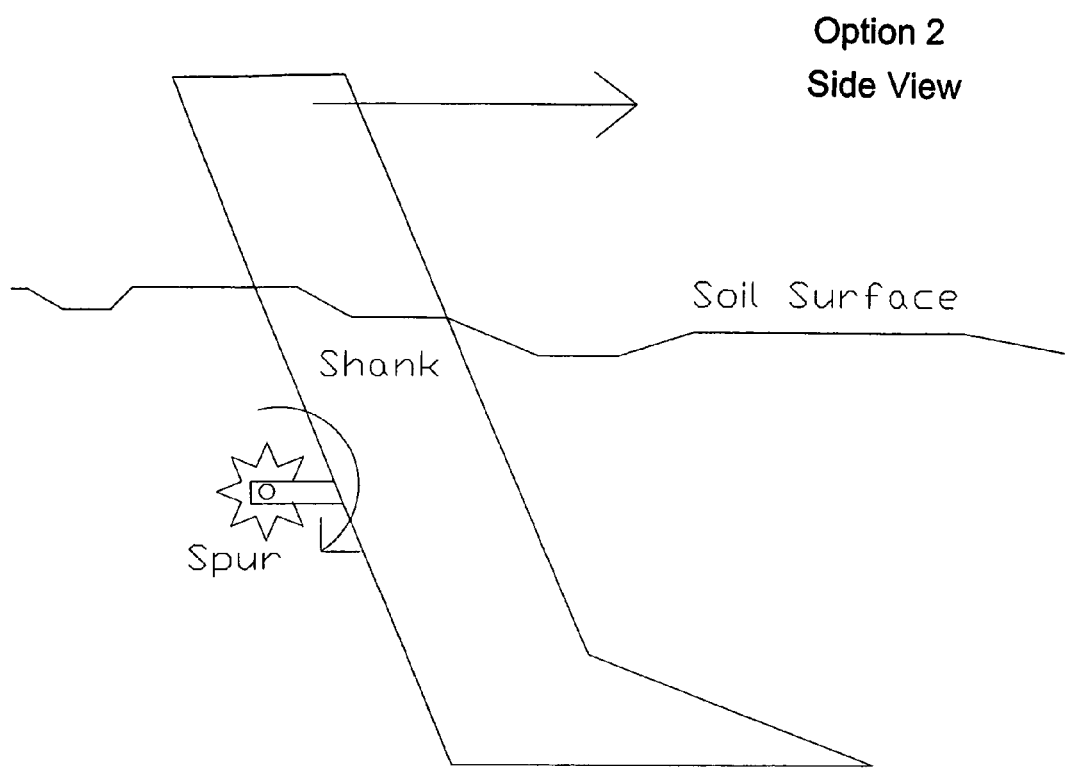
FIG. 8 is a side perspective view of one embodiment of the invention.

In another embodiment the spur is horizontally mounted to the rear of the shank near the bottom at an angle of more than 0 degrees to about 90 degrees relative to the vertical shank and extends out to one side of the shank (see FIG. 7). As the angle of attachment increases and nears 90 degrees, the size of the spur would also need to decrease. Therefore, the spur would need to be smaller than the spur described above (FIG. 1) which is mounted vertically on the bottom of the shank; generally, the diameter of the spur would be about 1 to about 2 inches (e.g., 1-2 inches) and about 0.25 to about 0.5 inches (e.g., 0.25-0.5 inches) thick. The horizontally mounted spur could be in addition to a larger spur mounted vertically on the bottom of the shank as described above (FIG. 1) and in addition to the spur described below (FIG. 8). The bottom of spur 7 projects slightly (e.g., about 0.25-about 0.5 inches (e.g., 0.25-0.5 inches)) to the side of the deep cutting subsoiler tool so that the spur, as it rotates, slightly tills up the soil that is smeared by a conventional subsoil ripper that lacks a spur. The spur is operatively connected to the shank, for example in a manner similar to the spur described above (FIG. 1).

Figure 9:
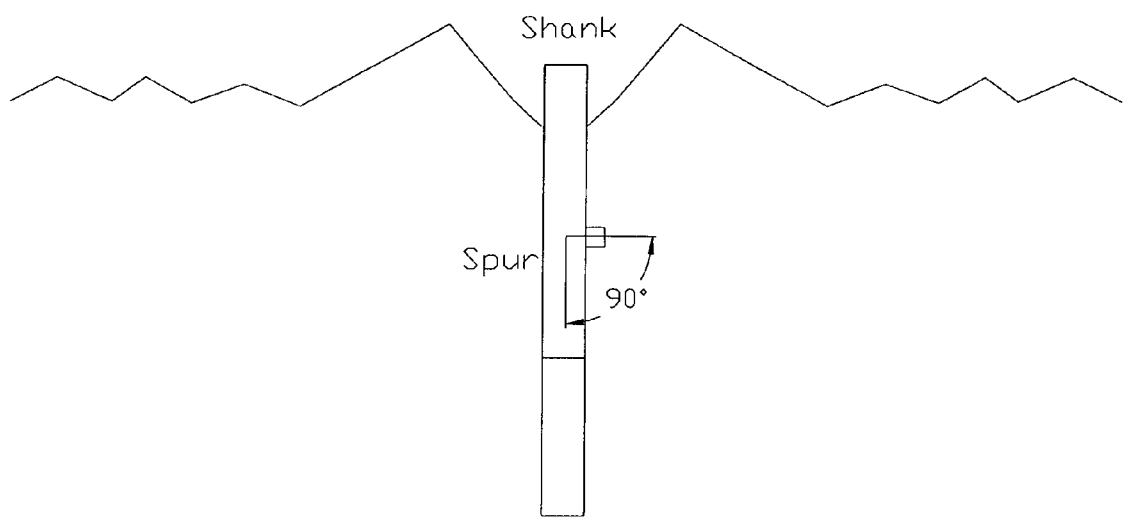
FIG. 9 is a front view of one embodiment of the invention.
Figure 9A:
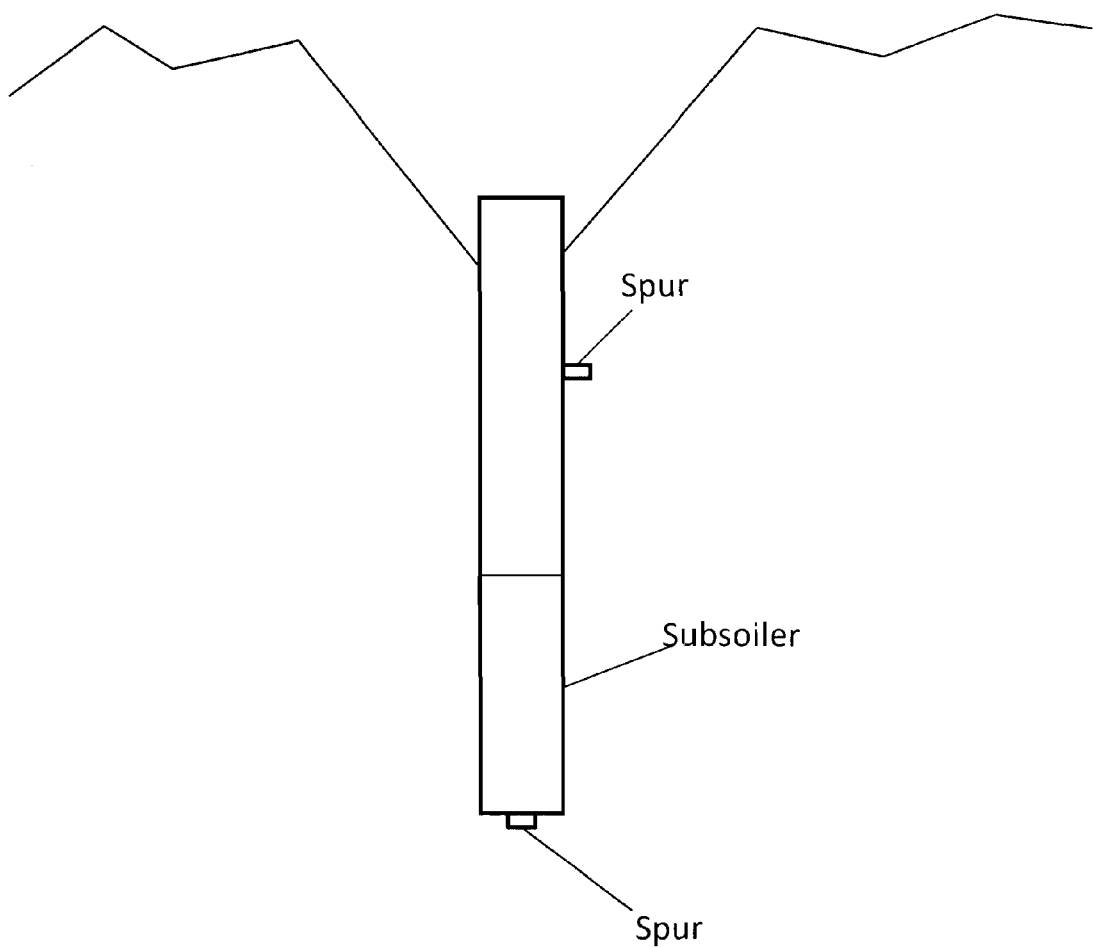
FIG. 9a is a front view of one embodiment of the invention.

In yet another embodiment the spur is horizontally mounted at an angle of more than 0 degrees to about 90 degrees relative to the vertical shank and extends out to one side of the shank (see FIGS. 8 and 9); unlike the spur shown in FIG. 7, the spur in this embodiment is attached further up the shank; for example about 1 to about 12 inches (e.g., 1-12 inches) from the bottom of the shank. The closer to 90 degrees the spur is mounted to the shank the spur would need to be smaller than the spur described above (FIG. 1) which is mounted vertically on the bottom of the shank; generally, the diameter of the spur would be about 1 to about 2 inches (e.g., 1-2 inches) and about 0.25 to about 0.5 inches (e.g., 0.25-0.5 inches) thick. The horizontally mounted spur could be in addition to a larger spur mounted vertically on the bottom of the shank as described above (FIG. 1) and in addition to the spur described in FIG. 7. The bottom of spur 7 projects slightly (e.g., about 0.25-about 0.5 inches (e.g., 0.25-0.5 inches)) to the side of the deep cutting subsoiler tool so that the spur, as it rotates, slightly tills up the soil that is smeared by a conventional subsoil ripper that lacks a spur. The spur is operatively connected to the shank in a manner, for example similar to the spur described above (FIG. 1).

Unless defined otherwise, all technical and scientific terms used herein have the same meaning as commonly understood by one of ordinary skill in the art to which the invention belongs. Any methods and materials similar or equivalent to those described herein can be used in the practice or testing of the present invention.

The following example is intended only to further illustrate the invention and is not intended to limit the scope of the invention as defined by the claims.

EXAMPLE

The experiment was started in Spring at the Agricultural Experiment Station's Tennessee Valley Research and Extension Center in Belle Mina, Ala. This study was designed to determine the effect of a straight point spur with 17 arms attached to a conventional subsoil ripper at two different depths in a conservation tillage system compared to a no-tillage system. The soil type was a Decatur silt loam (Fine, kaolinitic, thermic Rhodic Paleudults). Prior to this experiment the field was in no-tillage cotton for several years.

The experimental design was a randomized complete block with a 2×2 factorial arrangement of treatments augmented with an additional control treatment of no-tillage. The two factors were (1) tillage depth (shallow tillage 20 cm, and deep tillage 33 cm) and (2) deep tillage attachment (with the in-row subsoiler attachment (spur) and without the in-row subsoiler attachment). Each treatment was replicated four times (20 plots). The in-row subsoiler used was Kelley Manufacturing Company's (Tifton, Ga.) Rip/Strip in-row subsoiler with a straight standard 45° shank. The spurs with 17 arms were 17 tooth, ⅝ inch bore idler sprockets from #50 chain with an outside diameter of 3.62 in. made by Aetna Bearing Co., Franklin Park, Ill., part #AG-2416, purchased from Baum Hydraulics Corp, Omaha, Nebr., and attached to the bottom rear of the shank (similar to FIGS. 1-3). This in-row subsoiler was used for all treatments that received deep tillage (with and without the attachment).

The plots were four, 100 cm rows wide (4 meters) by 15 meters long. After the cotton was harvested in the Fall of the preceding year, the plot area was left fallow until the following Spring. Tillage was implemented and the cotton was planted 14 days later. Auburn University Extension recommendations were used to apply all fertilizers, herbicides, insecticides, and defoliants (Alabama Cooperative Extension System (ACES), 2006, Integrated pest management for cotton: Insect, disease, nematode, and weed control recommendations for 2006, ACES Publication 2006IPM-415). The center two rows were harvested and weighted to obtain seed cotton yield.

A three-dimensional dynamometer was attached between the tractor and the tillage implement at the time of tillage to measure tillage force. This device measured draft, vertical, and side forces required for each tillage treatment. A radar gun was used to obtain tillage speed, which was used along with draft to calculate deep tillage energy.

Data was subjected to ANOVA using the Statistical Analysis System (SAS Institute, 1988). Preplanned single degree of freedom contrast and Fisher's protected LSD were used for mean comparisons. A significance level of $P<0.100$ was established a priori.

Figure 10:
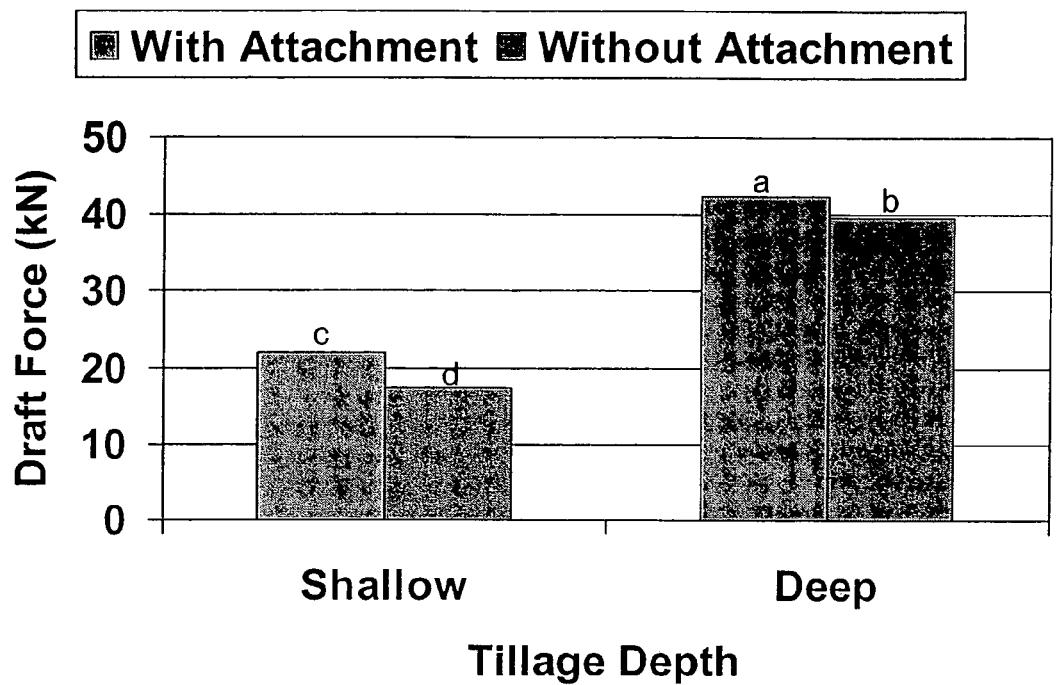
FIG. 10 shows tillage draft force for tillage treatments, letters indicate $LSD_{010}$.

Results and Discussion: Tillage forces were found to vary significantly between treatments. A single degree of freedom contrasts found that deep tillage (41 kN) required significantly greater draft force then the shallow tillage (20 kN) ($P<0.001$; FIG. 10). The in-row subsoiler attachment (spur) was also found to have a small increase in draft force. Treatments with the in-row subsoiler attachment required 32 kN compared to the treatments without the in-row subsoiler attachment which required 28 kN ($P<0.056$). Although this difference was significant it was relatively small compared to the difference between the shallow and deep tillage treatments.

Figure 11:
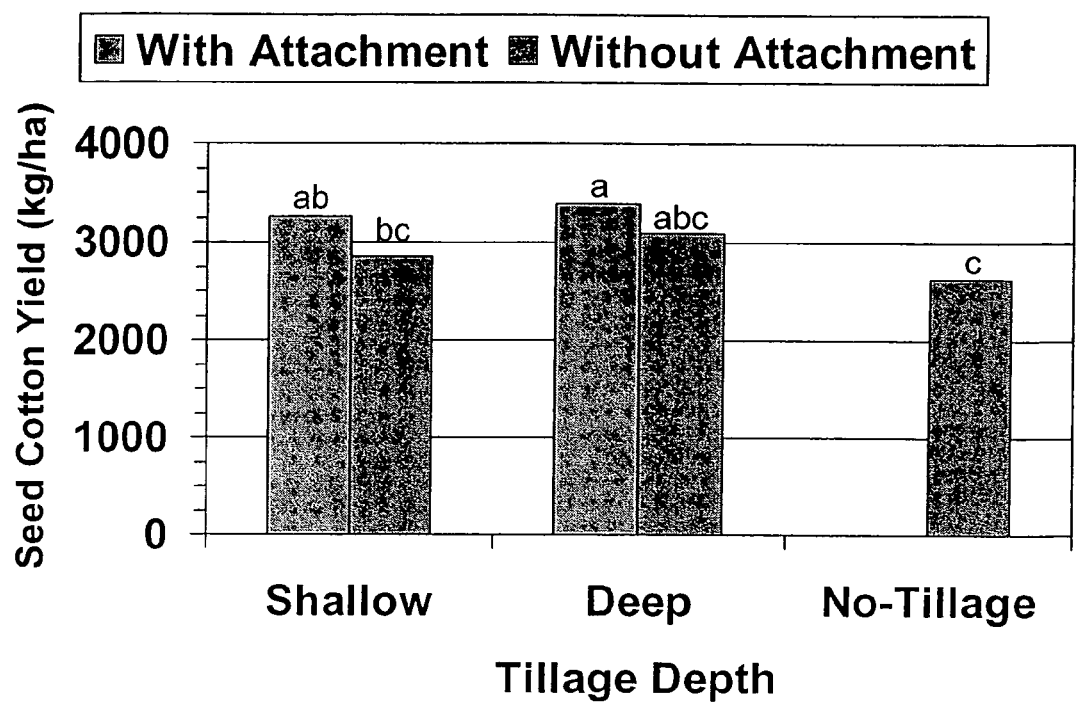
FIG. 11 shows seed cotton yield for tillage treatments, letters indicate $LSD_{010}$.

Seed cotton yield was also significantly affected by tillage treatment (FIG. 11). The shallow and deep tillage treatment with the in-row subsoiler attachment had a greater seed cotton yield then the no-tillage control treatment. A single degree of freedom contrasts found that the in-row subsoiler attachment treatments (3315 kg seed cotton/acre) had significantly greater seed cotton yield then the treatments without the in-row subsoiler attachment (2947 kg seed cotton/acre, $P<0.079$). This suggests that additional increases in yield may be obtained with in-row subsoiler attachment of the present invention compared to doing in-row subsoiling without attachments.

All of the references cited herein are incorporated by reference in their entirety. Also incorporated by reference in their entirety are the following U.S. Pat. Nos.: 5,695,012; 5,605,196; 5,499,685; 5,415,236; 5,152,349; 4,865,132; 4,775,013; 4,524,837; 4,418,760; 4,278,036; 4,194,573; 4,187,916; 4,050,521; 4,024,921. Also incorporated by reference in their entirety are the following: ASAE S477 DEC01, Terminology for Soil-Engaging Components for Conservation-Tillage Planters, Drills, and Seeders, ASAE Standards 20002, pages 345-350.

Thus, in view of the above, the present invention concerns (in part) the following:

In a subsoil ripper for subsoil tillage, the improvement comprising (or consisting essentially of or consisting of) at least one spur operatively connected to the shank of the subsoil ripper.

The above subsoil ripper, wherein said at least one spur is operatively connected to the posterior end (rear end) of said shank.

The above subsoil ripper, wherein said at least one spur is vertical relative to said shank.

The above subsoil ripper, wherein said at least one spur is at an angle of more than 0 degrees to about 90 degrees relative to said shank.

The above subsoil ripper, wherein said at least one spur is operatively connected to the posterior bottom end (rear end) of said shank. Wherein said at least one spur is vertical relative to said shank and/or wherein said at least one spur is at an angle of more than 0 degrees to about 90 degrees relative to said shank.

The above subsoil ripper, wherein said at least one spur is operatively connected to the posterior end (rear end) of said shank about 1 to about 12 inches from the bottom of said shank. Wherein said at least one spur is at an angle of more than 0 degrees to about 90 degrees relative to said shank.

The above subsoil ripper, wherein the arms of said spur are curved or straight.

The above subsoil ripper, wherein said spur has about 3 to about 30 arms.

The above subsoil ripper, wherein said spur has about 4 to about 20 arms.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. A subsoil ripper comprising:
   a shank member having a leading portion and a trailing portion;
   a subsoiler tool extending from the leading portion; a bottom of a tip portion of the subsoiler tool defining a horizontal tillage plane;
   a spur assembly including a spur extending from the trailing portion, at least a portion of said spur located below said horizontal tillage plane so that the spur tills soil below the horizontal tillage plane.

2. The subsoil ripper of claim 1 wherein the spur assembly comprises at least one bracket and the spur is connected to the shank by the at least one bracket.

3. The subsoil ripper of claim 2 wherein the spur extends below the horizontal tillage plane in the range of 0.25 to 0.5 inches.

4. The subsoil ripper of claim 2 wherein an axle extends through the bracket so that the spur is rotatable.

5. The subsoil ripper of claim 2 wherein an outer edge of the spur is corrugated so that the spur perforates and thereby aerates the soil.

6. The subsoil ripper of claim 2 wherein the spur is a sprocket.

7. The subsoil ripper of claim 2 wherein the spur has a diameter in a range of 3 to 6 inches.

8. The subsoil ripper of claim 2 wherein the spur has a thickness in a range of 0.25 to 1.5 inches.

9. The subsoil ripper of claim 2 wherein the subsoil ripper further comprises a second spur.

10. The subsoil ripper of claim 2 wherein the spur is comprised of a center hub with multiple pointed outwardly extending arms.

11. The subsoil ripper of claim 10 wherein an end portion of each of the outwardly extending arms is curved.

12. The subsoil ripper of claim 2 wherein:
    the subsoiler tool extends from the shank in an essentially vertical plane so that in operation the subsoiler tool moves horizontally in the vertical plane; and
    the spur assembly extends from the shank in a non-vertical plane so that in operation the spur moves horizontally in an angular plane relative to the subsoiler tool.

13. The subsoil ripper of claim 9 wherein the first spur extends in a vertical plane parallel to the subsoiler tool, and the second spur extends in an non-vertical angular plane relative to the first spur.

14. The subsoil ripper of claim 9 wherein the first spur extends below the horizontal tillage plane, and the second spur is positioned above the horizontal tillage plane.

15. A method of tilling a field, the method comprising the steps of:
    a) providing a subsoil ripper as described in claim 1; and
    b) propelling the subsoil ripper across a field so that the spur extends below the horizontal tillage plane and thereby tills up soil smeared by the subsoiler tool.

16. A method of making a subsoil ripper, the method comprising the steps of:
    a) providing a mobile farm implement;
    b) attaching a fist end of a shank to the farm implement so that in operation a second end of the shank is structured to extend below ground level;
    c) attaching a subsoiler tool to a leading portion of the second end of the shank; and
    d) attaching a spur assembly including a spur to a trailing portion of the second end so that the spur extends below a horizontal tillage plane defined by a bottom of a tip portion of the subsoiler tool.

17. The method of claim 16 further wherein the spur of step d) extends 0.25 to 0.5 inches below the horizontal tillage plane.

18. The method of claim 17 wherein the spur comprises a sprocket.

19. The method of claim 17 wherein the spur is comprised of a center hub with multiple pointed outwardly extending arms.

20. The method of claim 16 wherein the subsoiler tool of step c) extends from the shank in an essentially vertical plane, and the spur extends from the shank in a non-vertical angular plane relative to the subsoiler tool.

* * * * *